United States Patent
Tanimura et al.

[11] Patent Number: 6,054,102
[45] Date of Patent: Apr. 25, 2000

[54] OZONE PRODUCING APPARATUS UTILIZING FEEDBACK CONTROL FROM OZONE DENSITY MEASUREMENT

[75] Inventors: Yasuhiro Tanimura; Junji Hirotsuji; Shigeki Nakayama; Hisao Amitani; Hiroshi Yuge; Tateki Ozawa, all of Tokyo, Japan

[73] Assignee: Mitsubishi Denki Kabushiki Kaisha, Tokyo, Japan

[21] Appl. No.: 09/111,177

[22] Filed: Jul. 8, 1998

[30] Foreign Application Priority Data

Jul. 24, 1997 [JP] Japan ..................... 9-198437

[51] Int. Cl.[7] ............... B01J 19/08; B01J 19/12
[52] U.S. Cl. ............... 422/186.15; 422/186.07; 422/186.08
[58] Field of Search .............. 422/186.07, 186.08, 422/186.11, 186.15; 210/760

[56] References Cited

U.S. PATENT DOCUMENTS

| 4,430,306 | 2/1984 | Namba et al. |
| 4,453,953 | 6/1984 | Tanaka et al. |
| 4,552,659 | 11/1985 | Tabata et al. |
| 5,106,589 | 4/1992 | Conrad . |
| 5,888,271 | 3/1999 | Tanimura et al. ............ 95/12 |

FOREIGN PATENT DOCUMENTS

| 52-3595 | 1/1977 | Japan . |
| 55-61984 | 5/1980 | Japan . |
| 411092107 | 4/1999 | Japan . |

OTHER PUBLICATIONS

JPO Abstract of JP 411092107 A, Apr. 6, 1999.

Derwent abstracts, AN 78–28134A, JP 53 023894, Mar. 4, 1978.

Patent abstracts of Japan, vol. 006, No. 015 (C–089), Jan. 28, 1982, JP 56 140002, Nov. 2, 1981.

*Primary Examiner*—Kathryn Gorgos
*Assistant Examiner*—Wesley A. Nicolas
*Attorney, Agent, or Firm*—Oblon, Spivak, McClelland, Maier & Neustadt, P.C.

[57] ABSTRACT

An ozone producing apparatus comprising an ozone generator, an adsorption/desorption tower, and an ozone desorbing means for desorbing adsorbed and stored ozone for supply, wherein the apparatus further includes an ozone density measuring means, and a control circuit for adjusting an amount of electric power for the ozone generator by comparing the measured value detected by the measuring means with a set value. A specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

3 Claims, 13 Drawing Sheets

OZONE PRODUCING APPARATUS UTILIZING FEEDBACK CONTROL FROM OZONE DENSITY MEASUREMENT

BACKGROUND OF THE INVENTION

The present invention relates to an ozone producing apparatus. More particularly, it relates to an ozone producing apparatus for continuously producing ozone and storing the same in an adsorbed state and supplying the ozone when required by desorbing (separating) the same.

While a large quantity of cooling water is used at power stations and in chemical industries, microorganisms or seaweed in the water cause slime hazards and thereby resulting in blockage of canals or deterioration of heat exchange efficiency. One method which might be taken as a countermeasure to prevent such troubles is to employ ozone water of high density. In order to produce high density ozone water, it is more advantageous to employ a so-called intermittent ozone producing method, wherein a small sized ozone generator of small capacity is used to store the produced ozone by using an adsorbent over a long period and to take this stored ozone out from the adsorbent when required for producing high density ozone water, than producing ozone with an ozone generator of large capacity, in view of initial and running costs.

An ozone producing apparatus employing such an ozone producing method is known to comprise the following components as shown in FIG. 13: an ozone generator 50, an oxygen supply source 51, a circulating blower 52, an adsorption/desorption tower 53, a cooling source 54, a heating source 55, a water flow ejector 56 and switch valves 57a to 57g. The adsorption/desorption tower 53 is of double cylinder type of which inner cylinder is filled with an ozone adsorbent and an outer cylinder with heating medium. Silica gel might be employed as the ozone adsorbent, and ethylene glycol or alcohol group as the heating medium. It should be noted that the circulating blower 52, ozone generator 50 and adsorption/desorption tower 53 constitute, in this order, a circulating system.

Operations of the apparatus will now be explained. There are two operations in total, namely ozone adsorbing operation, and ozone desorbing operation.

The adsorbing operation will first be explained. Oxygen is supplied by the oxygen supply source 51 so that the pressure in the circulating system OL is always constant. In this case, the pressure is normally maintained at 1.5 kg/cm$^2$. When oxygen is made to flow in the circulating system by the circulating blower 52 while the switch valves 57c and 57d are in an opened condition, a part of the oxygen is converted into ozone to generate an ozonized oxygen while passing through the discharge space of the ozone generator 50, and the ozonized oxygen is then transferred to the adsorption/desorption tower 53. The adsorbent in the adsorption/desorption tower 53 selectively adsorbs ozone, and the remaining oxygen is returned to the circulating blower 52 through the switch valve 57c. Oxygen which has been consumed as ozone to be adsorbed is supplemented through the oxygen supply source 51. Since the adsorbent assumes a property that adsorption capacity of ozone varies depending on temperature, the adsorbent is cooled by the cooling source 54 to not more than −30° C. That is, the lower the temperature becomes, an amount of ozone adsorption increases, while the higher the temperature becomes, it decreases. Accordingly, the temperature of adsorbent is raised by the heating source 55 when desorbing ozone.

When the adsorbent in the adsorption/desorption tower 53 has adsorbed ozone to approach the ozone saturation adsorption amount, the desorbing operation of ozone is performed. In the desorbing operation, operations of the ozone generator 50, circulating blower 52 and cooling source 54 are terminated and the switch valves 57a to 57d are closed. Thereafter, the heating source 55 and water flow ejector 56 start their operation and switch valves 57e to 57g are opened. At this time, temperature of the adsorbent is raised by applying heat through the heating source 55 so that ozone which has been adsorbed by the adsorbent can be easily desorbed therefrom. By depressing to suck ozone in the adsorption/desorption tower 53 by means of the water flow ejector 56, ozone is dispersed into water in the water flow ejector 56 to be dissolved and sent to, as ozone water, places where it is used. When the desorbing period is completed in this way, the process returns to the initial adsorbing operation and is continuously repeated.

Depending on the temperature of the water or on the degree of pollution of the water, the speed of multiplication of microorganisms and seaweed in water which cause slime hazards varies as well as the reactive speed of ozone. Therefore, the amount of required ozone also varies depending on seasonal fluctuations of water temperature or fluctuations in the degree of pollution of the water. However, the amount of stored ozone can not be adjusted in a conventional apparatus, so that it might often happen that ozone can not be provided to be just sufficiently enough for removing slime. That is, when the amount of ozone is small, there can not be achieved normal slime adhesion preventing effects, and when the amount of ozone is large, it is not only uneconomical but might also cause generation of oxidants when applied to sea water wherein ozone reacts with brominated ion in the sea water to generate oxidants so that a decomposing device for such oxidants will be required, resulting in a large sized apparatus.

Further, when a conventional apparatus is continuously used over a long term, the amount of stored ozone might also be varied due to changes in ozone adsorbing performance of silica gel or changes in the performance of the ozone generator and might cause abundance/shortage of ozone.

The present invention has been made in view of the above circumstances, and it is an object of the present invention to provide an ozone producing apparatus which is economical and with which hardly no byproducts such as oxidants are generated by continuously storing an amount of ozone required for obtaining suitable slime removing effects in accordance with fluctuations of qualities or temperature of water.

SUMMARY OF THE INVENTION

The ozone producing apparatus of a first invention comprises an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring means for measuring a density of desorbed ozone, and a control circuit for adjusting an amount of electric power for the ozone generator by comparing the measured value detected by the measuring means with a set value.

The ozone producing apparatus of a second invention comprises an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring means for measuring a density of desorbed ozone, and a control circuit for adjusting a gas pressure for the ozone generator by comparing the measured value detected by the measuring means with a set value.

The ozone producing apparatus of a third invention comprises an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring means for measuring a density of desorbed ozone, and a control circuit for adjusting a temperature in the adsorption/desorption tower by comparing the measured value detected by the measuring means with a set value.

The ozone producing apparatus of a fourth invention comprises an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes a pressure measuring means for measuring a pressure of desorbed gas, and a control circuit for adjusting an amount of electric power for the ozone generator by comparing the measured value detected by the measuring means with a set value.

The ozone producing apparatus of a fifth invention comprises an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes a pressure measuring means for measuring a pressure of desorbed gas, and a control circuit for adjusting a gas pressure for the ozone generator by comparing the measured value detected by the measuring means with a set value.

BRIEF EXPLANATIONS OF THE DRAWINGS

DETAILED DESCRIPTION OF THE INVENTION

Embodiment 1

Figure 1:
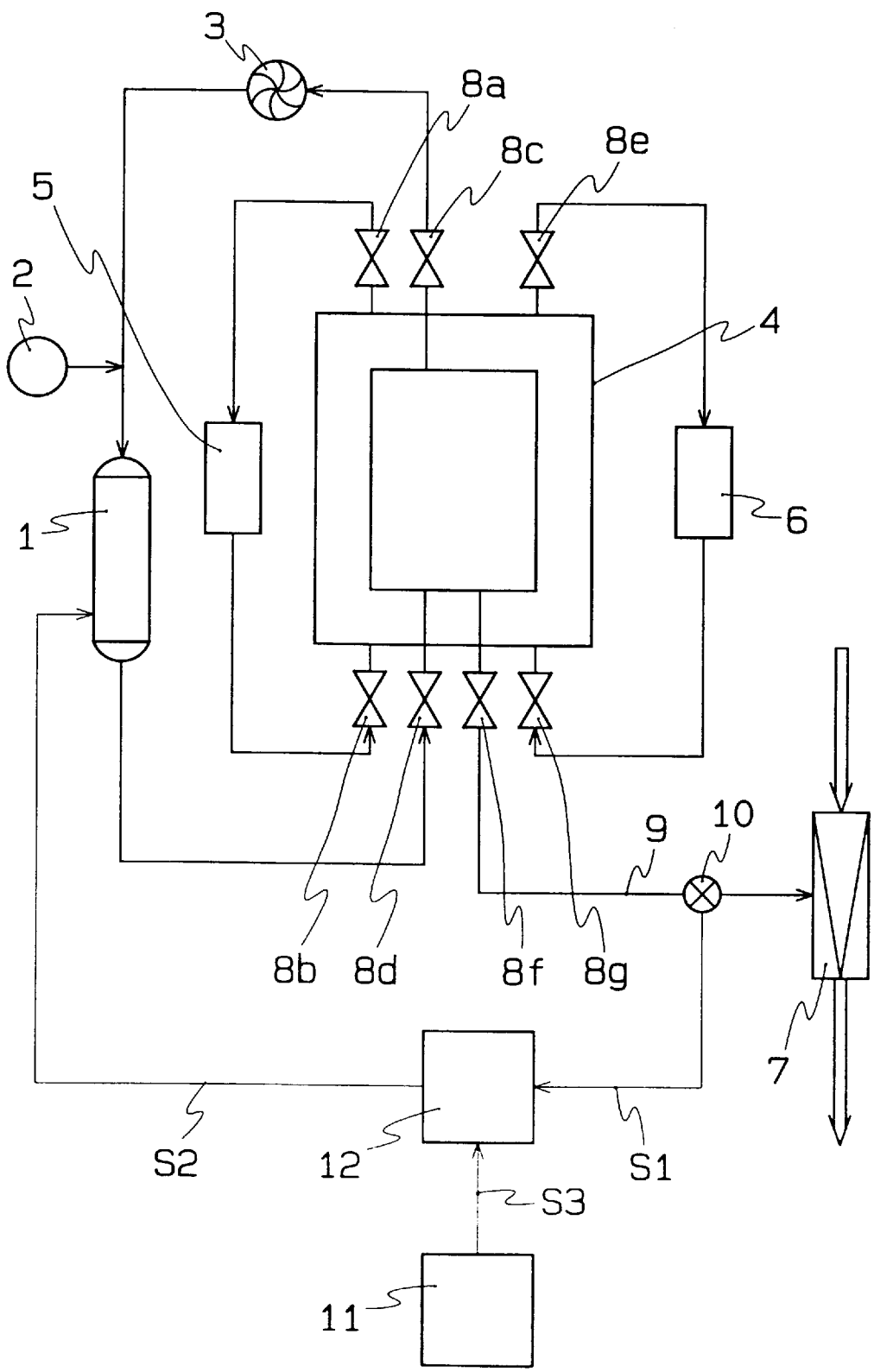
FIG. 1 is a diagram showing an arrangement of an ozone producing apparatus according to Embodiment 1 of the present invention.

FIG. 1 is a diagram showing an arrangement of an ozone producing apparatus according to Embodiment 1 of the present invention. Such an apparatus comprises, as shown in FIG. 1, an ozone generator 1 for generating ozonized oxygen, an oxygen supply source 2, a circulating blower 3, an adsorption/desorption tower 4, a cooling source 5, a heating source 6, a water flow ejector 7 which is an ozone desorbing means, switch valves 8a to 8g, and an ozone density detecting means. The ozone density detecting means comprises an ozone densitometer 10 provided to a piping 9, which is an ozone density measuring means, and a control circuit 12 for comparing a measured value detected by the measuring means and a set value from a setting device 11. The ozone densitometer 10 and the control circuit 12, the control circuit 12 and the ozone generator 1, and the control circuit 12 and the setting device 11 are connected to each other, respectively, through signal lines S1, S2 and S3. The adsorption/desorption tower 4 is of double cylinder type wherein an inner cylinder is filled with an adsorbent and an outer cylinder is filled with a thermal medium. It is preferable to select an adsorbent having a low decomposing rate when it comes into contact with ozone. For example, silica gel, activated alumina or porous materials impregnated with fluorocarbon can be employed. On the other hand, ethylene glycol or alcohol group might be used as the thermal medium. It should be noted that the circulating blower 3, ozone generator 1 and adsorption/desorption tower 4 constitute, in this order, a single circulating system.

Operations of the apparatus will now be explained. There are two operations in total, namely ozone adsorbing operation, and ozone desorbing operation.

The adsorbing operation will first be explained. Oxygen is supplied by the oxygen supply source 2 so that the pressure in the circulating system is always constant, for example 1.5 kg/cm$^2$. When oxygen is made to flow in the circulating system by the circulating blower 3 while the switch valves 8a and 8d are in an opened condition, a part of the oxygen is converted into ozone through silent discharge to generate an ozonized oxygen while passing through the discharge space of the ozone generator 1, and the ozonized oxygen is then transferred to the adsorption/desorption tower 4. The adsorbent in the adsorption/desorption tower 4 selectively adsorbs ozone, and the remaining oxygen is returned to the circulating blower 3 through the switch valve 8c. Oxygen which has been consumed as ozone is supplemented through the oxygen supply source 2. Since the adsorbent assumes a property that adsorption capacity of ozone increases if the adsorbent is cooled more, the cooling temperature is generally maintained by the cooling source 5 to not more than −40° C. Further, the higher the pressure in the circulating system becomes, the more efficiently ozone can be stored. However, in view of ozone generating efficiency and ozone storing efficiency, an excessive increase of pressure in the circulating system results in an increase in consumption of electricity at the time of storage so that it is desirable to maintain a pressure of about 5 kg/cm$^2$G in maximum.

When the adsorbent in the adsorption/desorption tower 4 has adsorbed ozone to approach an ozone saturation adsorption amount, the desorbing operation is performed. In the desorbing operation, ozone which is stored in the adsorption/desorption tower 4 is taken out from the adsorption/desorption tower 4 through applying heat and decompressing by operating the water flow ejector 7 and the heating source 6, wherein the density of desorbed ozone is continuously or intermittently measured by the ozone densitometer 10 provided to the piping 9. The obtained value is sent to the control circuit 12 via signal line S1. The control circuit 12 compares the measured value for the desorbed ozone density and a set value for the ozone density set by the setting device 11 and supplied by signal line S3, and calculates an amount of electric power for the ozone generator 1 for obtaining the set density of desorbed ozone by, for instance, the following equation:

$$E=K(O_3o-O_3s)$$

Note that E denotes a calculated value (control target value) for the amount of electric power for the ozone generator 1, $O_3o$ a measured value for the density of desorbed ozone, $O_3s$ a control set value for the density of desorbed ozone, and K a control gain.

The calculated value E for the amount of electric power for the ozone generator 1 is sent to the ozone generator 1 via signal line S2 and the amount of electric power is adjusted in the ozone generator 1 to coincide with the calculated value.

While the ozone generator for producing ozone is terminated in the desorbing process since an adsorbing process in which ozone is adsorbed and stored in the adsorption/desorption tower 4 and a desorbing process for desorbing the same is alternately performed, this embodiment is arranged in such a manner that the density of desorbed ozone is measured in the desorbing process and the amount of electric power of ozone for the ozone generator 1 is calculated for the following adsorbing process to operate the ozone generator 1 in the following adsorbing process by using this calculated value.

When employing this apparatus for preventing slime adhesion to a piping, important factors for the treatment are a peak density of desorbed ozone and a treatment time, and therefore improved effects can be obtained by measuring a peak value for the ozone density at the time of desorption and maintaining this value to a specified value; by measuring a time in which the density of desorbed ozone is not less than a reference value and making this time to be a specified time; or by maintaining the density of desorbed ozone after a specified time has passed from the start of desorption since ozone of high density can be obtained at the start of desorption. It is of course possible to continuously measure fluctuations in the density of desorbed ozone and to make the whole fluctuation pattern to be a specified pattern.

While this embodiment has been explained by taking a case in which the ozone generator is continuously driven without changing the time for the desorbing process but adjusting the amount of electric power per hour, it is also possible to adjust the amount of electric power without changing the amount of electric power per hour but by changing the time for the desorbing process.

Since the present embodiment is arranged in such a manner that the density of desorbed ozone is measured and the amount of electric power for the ozone generator 1 is adjusted such that the measured value is made to be the specified value, a specified amount of ozone can be desorbed and treated in a stable manner also in a case in which characteristics of the adsorbent or the ozone generator should happen to be changed, so that adhesion of slime can be prevented in a stable manner over a long period.

Embodiment 2

Figure 2:
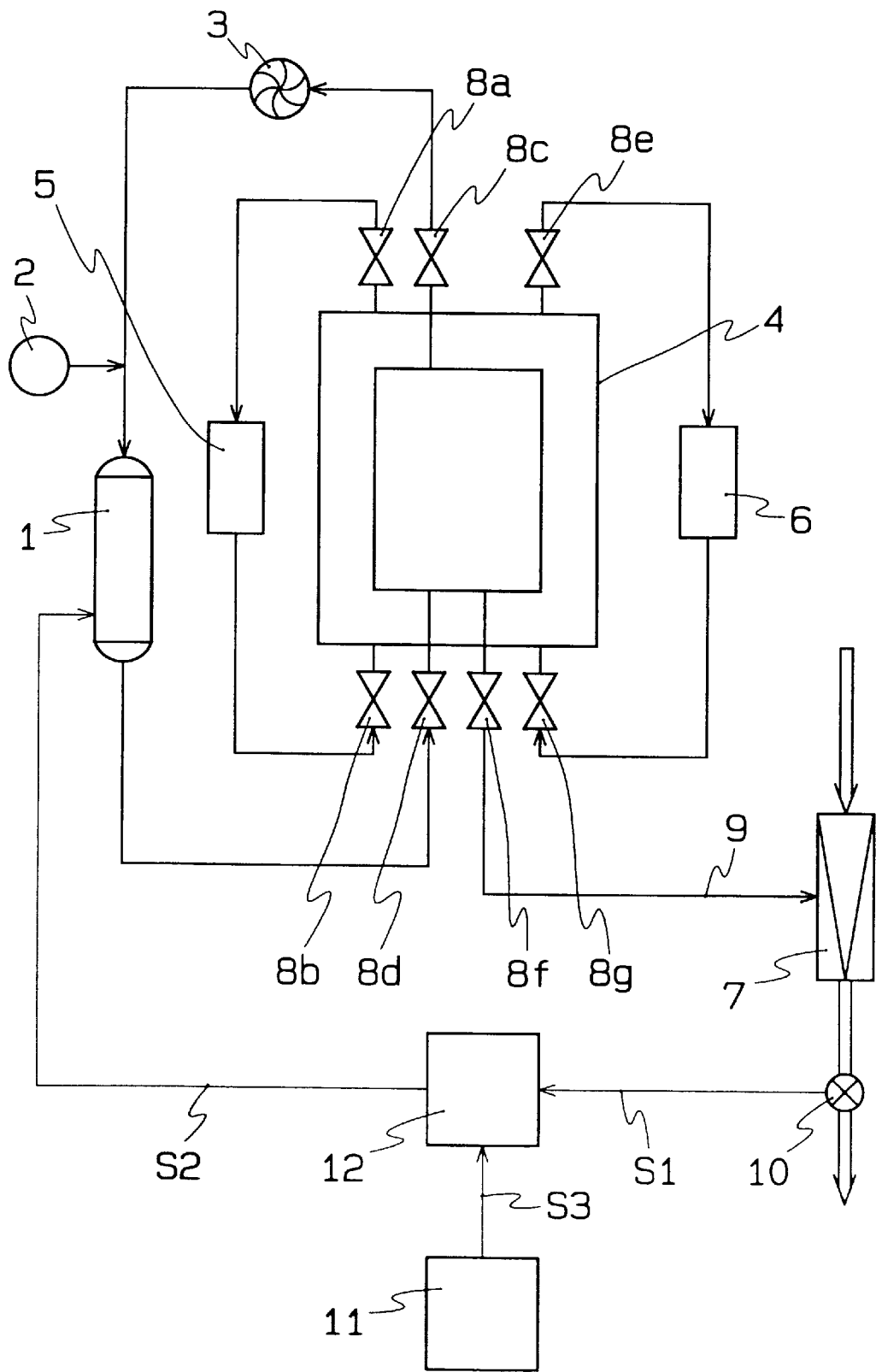
FIG. 2 is a diagram showing an arrangement of an ozone producing apparatus according to Embodiment 2 of the present invention.

FIG. 2 is a diagram showing an arrangement of an ozone producing apparatus according to Embodiment 2 of the present invention. In FIG. 2, an ozone densitometer 10 is disposed at a preliminarily determined location is a downstream side of a water flow ejector 7 instead of at a piping 9. The remaining arrangements are identical with those of the apparatus of FIG. 1.

Operations will now be explained. While the density of desorbed ozone in a gaseous state has been measured in the previous embodiment, this embodiment is arranged in such a manner that a density of desorbed ozone in a liquid state is measured. That is, the ozone density is measured at a preliminarily determined location in the downstream side of the water flow ejector 7 at the time of performing a desorbing process, and this value is sent to the control circuit 12 via a signal line S1. The remaining operations are identical with those of the case of Embodiment 1 as previously described.

That is, the ozone density at the time of desorption is measured, and based on the peak value of ozone density at the time of desorption or time for exceeding a specific density which are obtained therefrom, based on a measured value after a specified time has lapsed from the start of the desorption, or based on the whole fluctuation pattern of the measured value, the amount of electric power for the ozone generator 1 is calculated at the control circuit 12 to set these to specified values, and the ozone generator 1 is driven in the following desorbing process by using this calculated value.

Since the present embodiment is arranged in such a manner that the density of desorbed ozone is measured at a preliminarily determined location in the downstream side of the water flow ejector 7 and the amount of electric power for the ozone generator 1 is adjusted based on the measured value such that it is made to be the specified value, a specified amount of ozone can be desorbed and treated in a stable manner also in a case in which characteristics of the adsorbent or the ozone generator, temperature or degree of pollution of the water, multiplication speed of microorganisms, or reaction speed of ozone should happen to be changed, so that adhesion of slime can be prevented in a stable manner over a long period.

Embodiment 3

Figure 3:
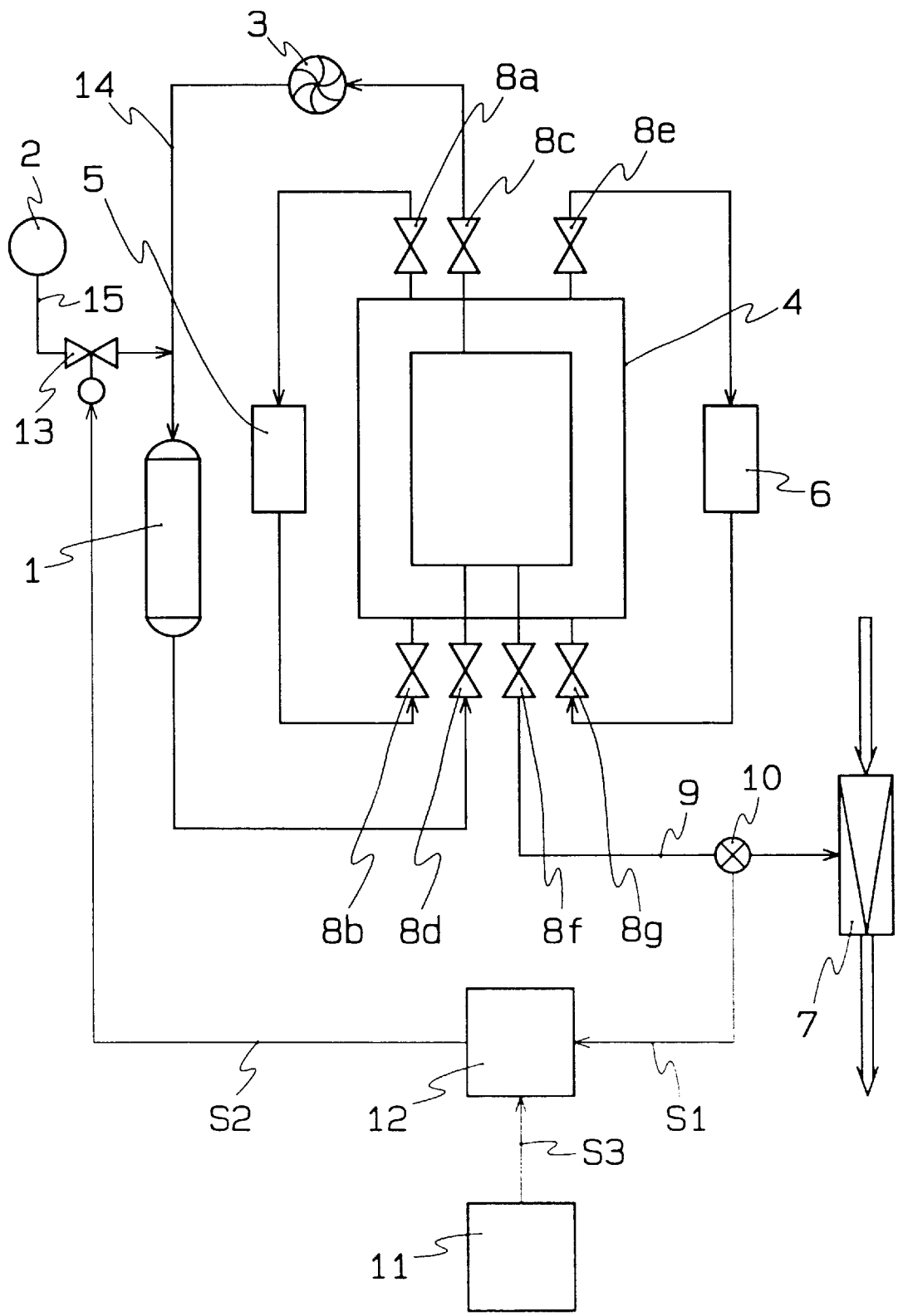
FIG. 3 is a diagram showing an arrangement of an ozone producing apparatus according to Embodiment 3 of the present invention.

FIG. 3 is a diagram showing an arrangement of an ozone producing apparatus according to Embodiment 3 of the present invention. In FIG. 3, numeral 13 denotes a pressure adjusting valve provided to a piping 15 which connects an oxygen supply source 2 and a circulating piping 14. A signal line S2 connects a control circuit 12 and the pressure adjusting valve 13. The remaining arrangements are identical with those of the apparatuses of FIG. 1 and FIG. 2.

Operations will now be explained. Such operations are almost identical with those of the previous Embodiments 1 and 2. That is, the density of desorbed ozone is measured by using the ozone densitometer 10 provided to the piping 9. This measured value is supplied to the control circuit 12 via a signal line S1, and the control circuit 12 calculates a control target value for the pressure in the ozone generator 1 by using, for instance, the following equation based on the measured value for the desorbed ozone density and the set value for the desorbed ozone density which is set at the setting device 11 and supplied via signal line S3.

$$B=K(O_3o-O_3s)$$

Note that B denotes a circuit target value for the pressure in the ozone generator 1.

The calculated value is sent to the pressure adjusting valve 13 through the signal line S2, and the pressure adjusting valve 13 adjusts oxygen supply such that the pressure in the ozone generator 1, that is, the pressure in the piping 14 is made to be this value. By changing the pressure in the ozone generator 1, the ozone generating characteristics are changed so that the amount of ozone which is adsorbed and stored at the adsorbent in the adsorption/desorption tower 4 can be adjusted.

Since this embodiment is arranged in such a manner that the density of desorbed ozone is measured and the pressure for the ozone generator 1 is adjusted such that the measured value is made to be the specified value, a specified amount of ozone can be desorbed and treated in a stable manner also in a case in which characteristics of the adsorbent or the ozone generator should happen to be changed, so that adhesion of slime can be prevented in a stable manner over a long period.

Embodiment 4

Figure 4:
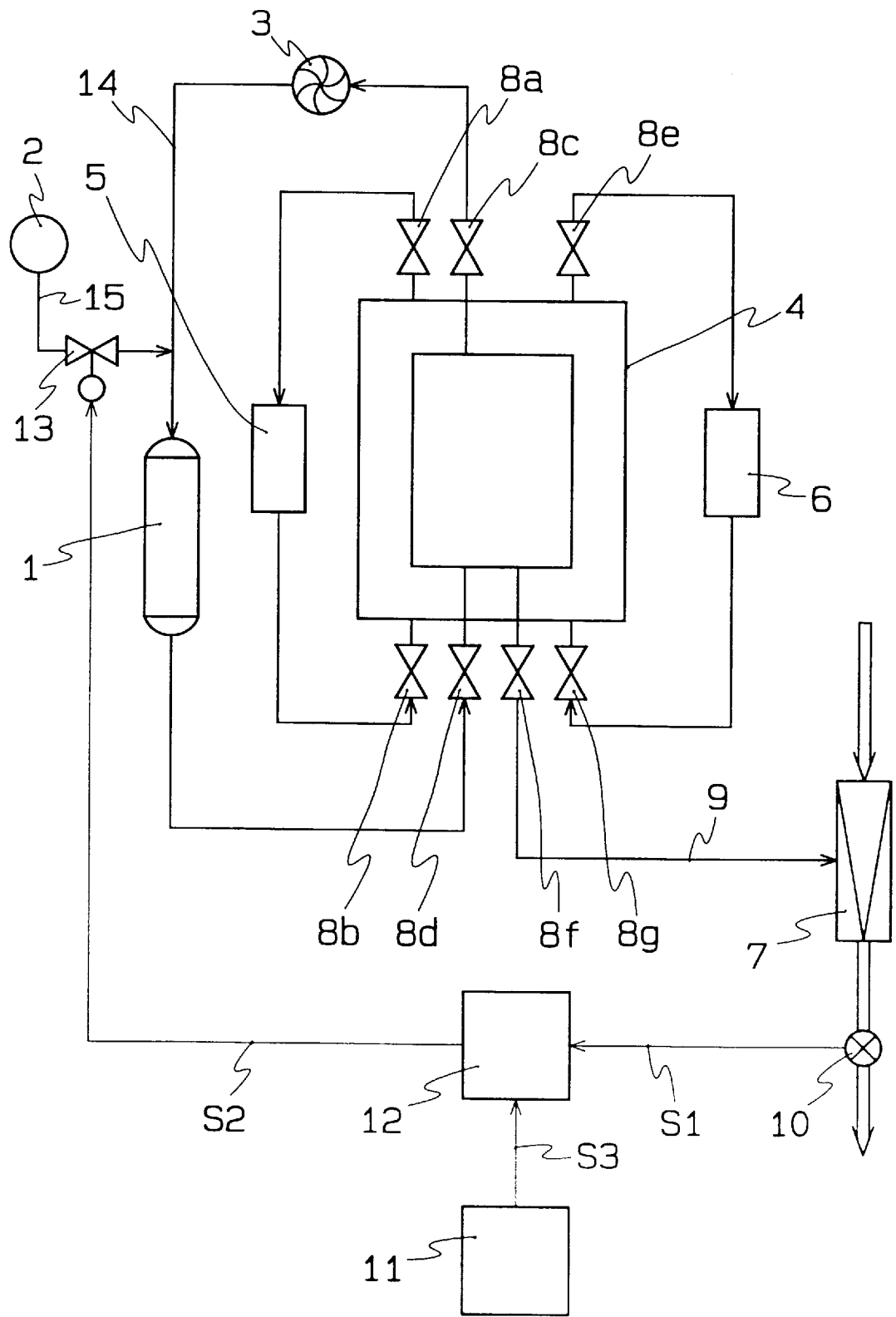
FIG. 4 is a diagram showing an arrangement of an ozone producing apparatus according to Embodiment 4 of the present invention.

FIG. 4 is a diagram showing an arrangement of an ozone producing apparatus according to Embodiment 4 of the present invention. In FIG. 4, an ozone densitometer 10 is disposed at a preliminarily determined location in the downstream side of a water flow ejector 7. The remaining arrangements are identical with those of the apparatus of FIG. 3.

Operations will now be explained. While the density of desorbed ozone in a gaseous state has been measured in the previous embodiment, this embodiment is arranged in such a manner that a density of desorbed ozone in a liquid state is measured. That is, the ozone density is measured at a preliminarily determined location in the downstream side of the water flow ejector 7 at the time of performing a desorbing process, and this value is sent to the control circuit 12 via signal line S1. The remaining operations are identical with those of the case of Embodiment 3 previously described.

That is, the ozone density at the time of desorption is measured, and based on the peak value of ozone density at the time of desorption or time for exceeding a specific density obtained therefrom, based on a measured value after a specified time has lapsed from the start of the desorption, or based on the whole fluctuation pattern of the measured value, the control target value for the pressure in the ozone generator 1 is calculated at the control circuit 12 to set these to specified values, and the pressure adjusting valve 13 for providing oxygen is operated to adjust the pressure in the ozone generator 1 by using the calculated value in the following adsorbing process.

Since the present embodiment is arranged in such a manner that the density of desorbed ozone is measured at a preliminarily determined location in the downstream side of the water flow ejector 7 and the pressure adjusting valve 13 for providing oxygen is operated to adjust the pressure in the ozone generator 1 based on this measured value to be the specified value, a specified amount of ozone can be desorbed and treated in a stable manner also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

Embodiment 5

Figure 5:
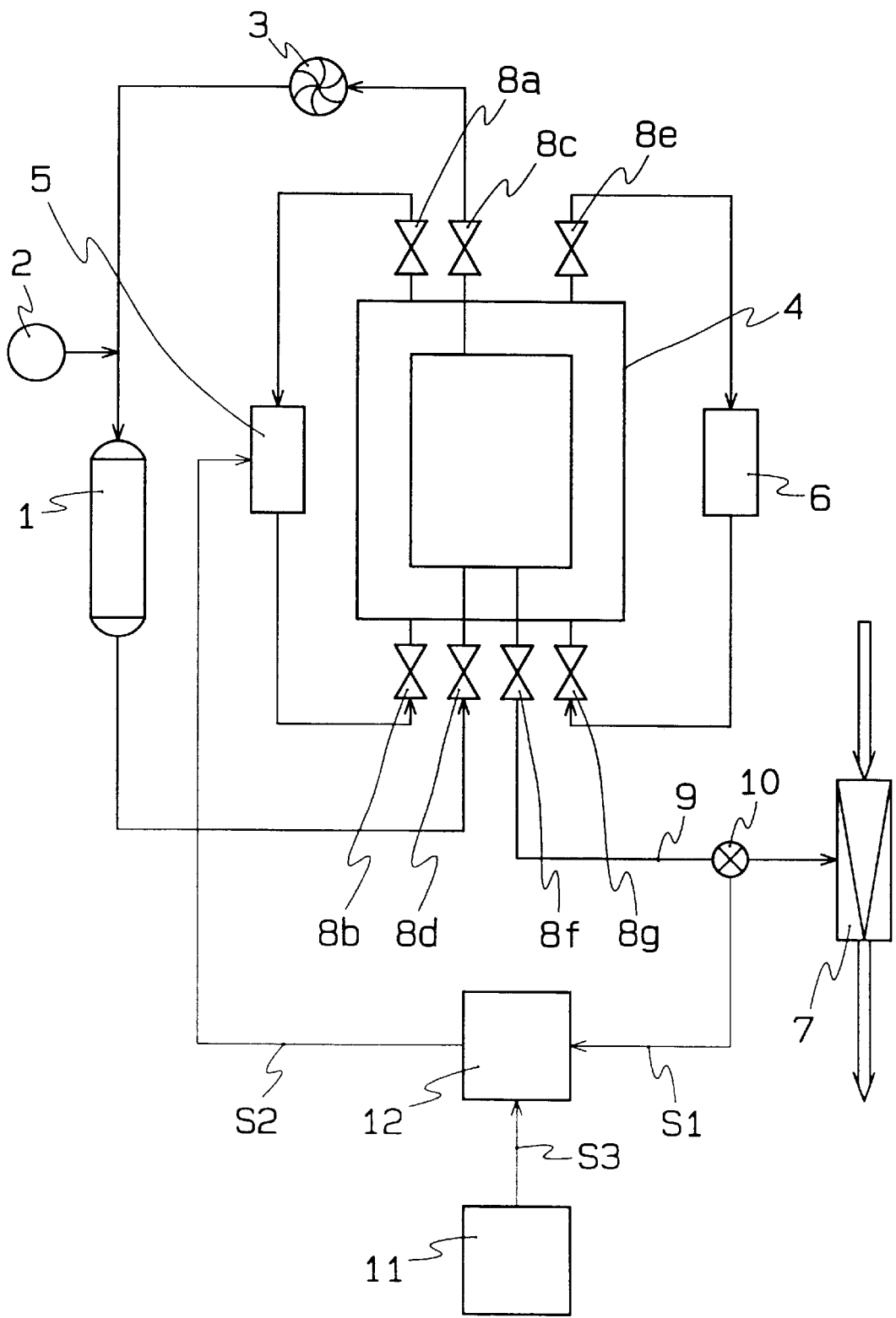
FIG. 5 is a diagram showing an arrangement of an ozone producing apparatus according to Embodiment 5 of the present invention.

FIG. 5 is a diagram showing an arrangement of an ozone producing apparatus according to Embodiment 5 of the present invention. In FIG. 5, a signal line S2 connects a control circuit 12 and a cooling source 5. The remaining arrangements are identical with those of the apparatus of FIG. 3.

Operations will now be explained. These operations are almost identical with those of Embodiment 3. That is, the density of desorbed ozone is measured by using an ozone densitometer 10 provided to a piping 9. This measured value is supplied to the control circuit 12 via a signal line S1, and the control circuit 12 calculates a control target value for the cooling temperature of the cooling source 5 by using, for instance, the following equation based on the measured value for the desorbed ozone density and the set value for the desorbed ozone density which is set at the setting device 11 and supplied via a signal line S3.

$$Tc=K(O_3o-O_3s)$$

Note that Tc denotes a control target value for the cooling temperature in the cooling source 5.

This calculated value is sent to the cooling source 5 via signal line S2, and the cooling source 5 so adjusts the temperature of the cooling medium, that is, the cooling temperature for the adsorbent in the adsorption/desorption tower 4 as to be this value. By changing the cooling temperature of the adsorbent, the ozone adsorbing characteristics of silica gel change so that the amount of ozone adsorbed and stored at the adsorbent in the adsorption/desorption tower 4 can be adjusted.

Since this embodiment is arranged in such a manner that the density of desorbed ozone is measured and the temperature of the cooling medium in the cooling source 5, that is, the cooling temperature of the adsorbent in the adsorption/desorption tower 4, is adjusted such that the measured value is made to be the specified value, a specified amount of ozone can be desorbed and treated in a stable manner also in a case in which characteristics of the adsorbent of the ozone generator should happen to be changed, so that adhesion of slime can be prevented in a stable manner over a long period.

Embodiment 6

Figure 6:
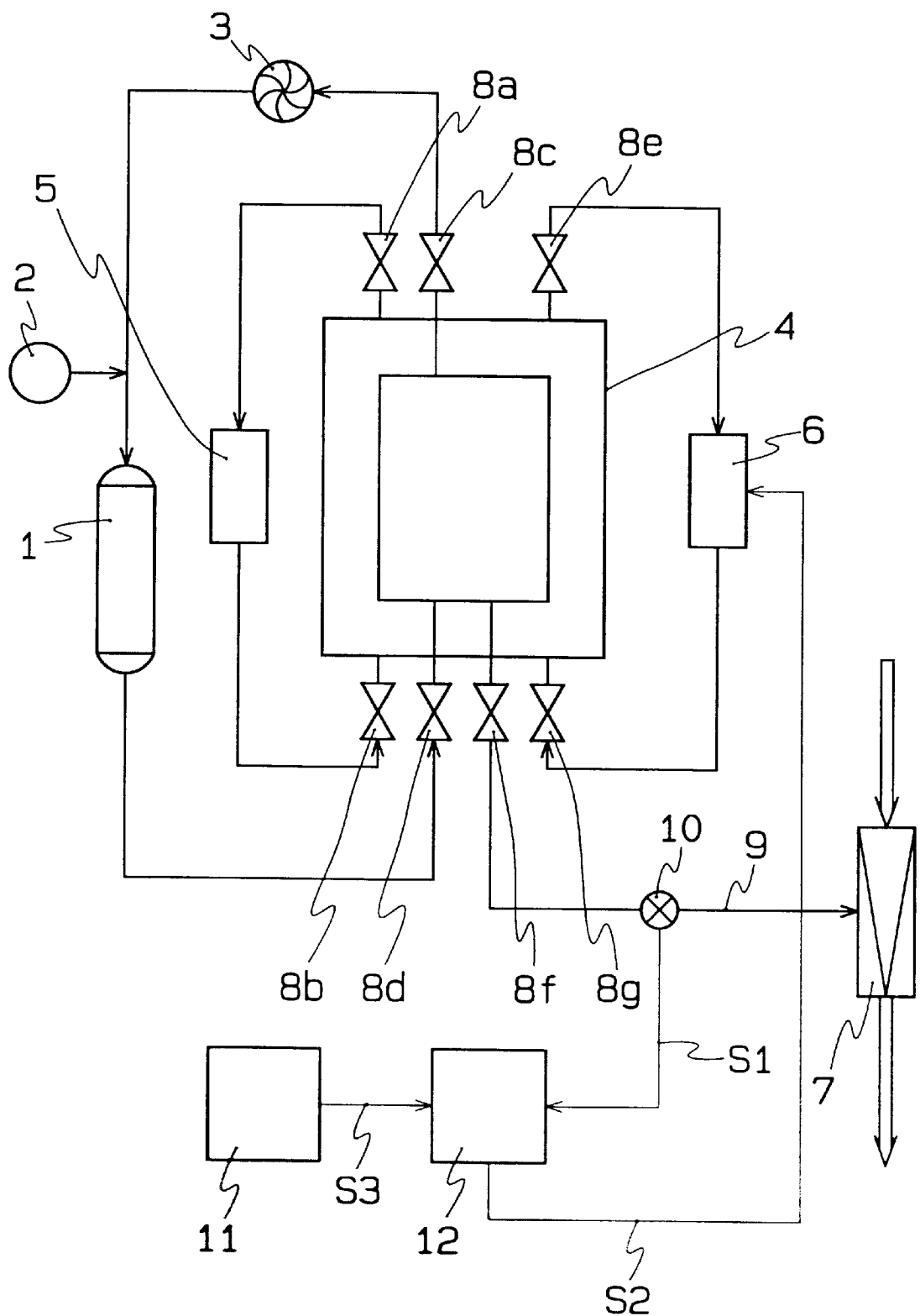
FIG. 6 is a diagram showing an arrangement of an ozone producing apparatus according to Embodiment 6 of the present invention.

FIG. 6 is a diagram showing an arrangement of an ozone producing apparatus according to Embodiment 6 of the present invention. In FIG. 6, a signal line S2 connects a control circuit 12 and a heating source 6. The remaining arrangements are identical with those of the apparatus of FIG. 5.

Operations will now be explained. These operations are almost identical with those of Embodiment 5. That is, the density of desorbed ozone is measured by using an ozone densitometer 10 provided to a piping 9. This measured value is supplied to the control circuit 12 via a signal line S1, and the control circuit 12 calculates a control target value for the heating temperature of the heating source 6 based on the measured value for the desorbed ozone density and the set value for the desorbed ozone density which is set at the setting device 11 and supplied via a signal line S3, similarly to Embodiment 5.

This calculated value is sent to the heating source 6 via the signal line S2, and the heating source 6 so adjusts the heating temperature for the medium, that is, the temperature of the adsorbent in the adsorption/desorption tower 4 at the time of desorption as to be this value. By changing the heating temperature of the adsorbent, the ozone adsorbing characteristics of the adsorbent change so that the amount of ozone adsorbed and stored at the adsorbent in the adsorption/desorption tower 4 can be adjusted.

Since this embodiment is arranged in such a manner that the density of desorbed ozone is measured and the temperature of the medium in the heating source 6, that is, the heating temperature of the adsorbent in the adsorption/desorption tower 4, is adjusted such that the measured value is made to be the specified value, a specified amount of ozone can be desorbed and treated in a stable manner also in a case in which characteristics of the adsorbent of the ozone generator should happen to be changed, so that adhesion of slime can be prevented in a stable manner over a long period.

Embodiment 7

Figure 7:
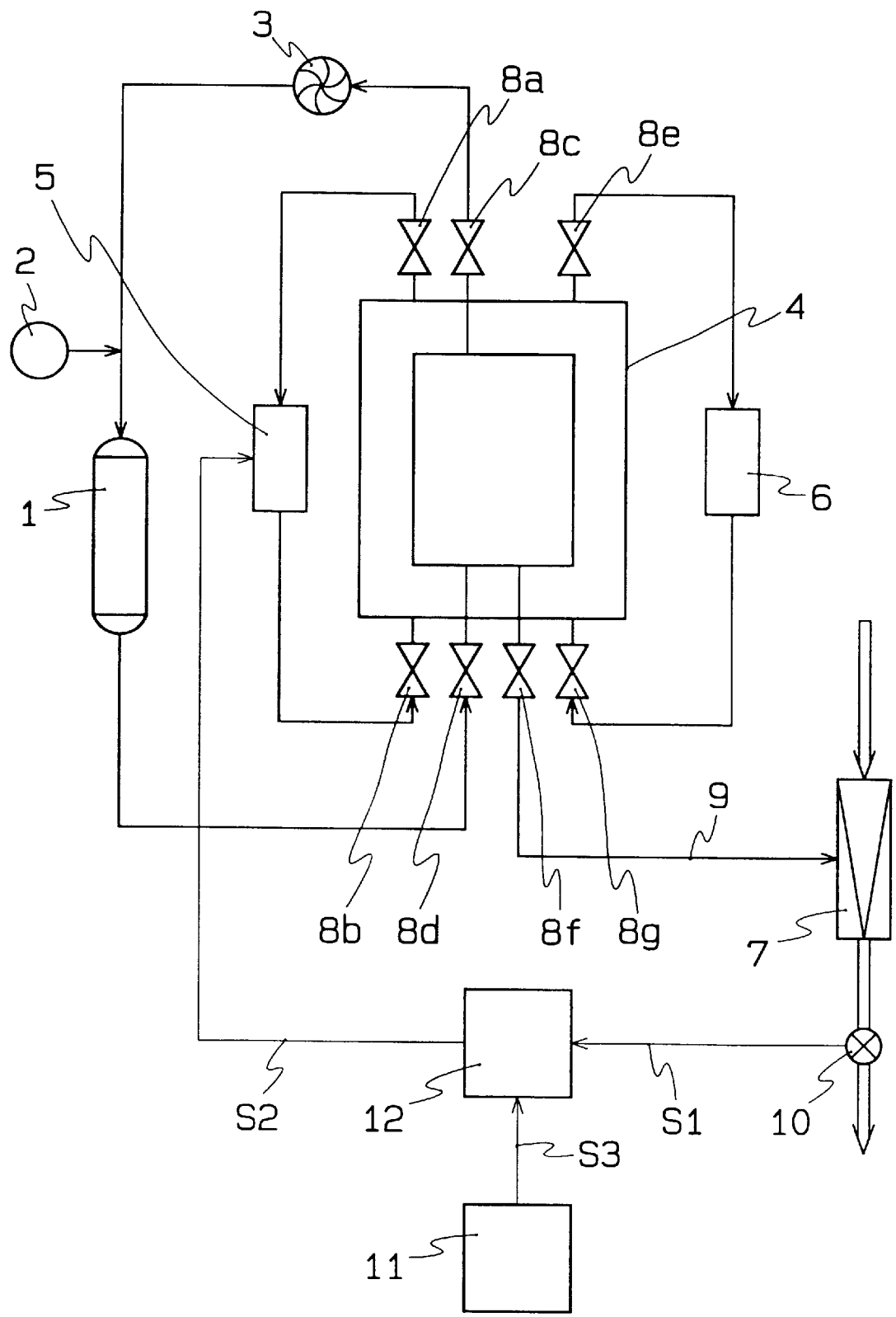
FIG. 7 is a diagram showing an arrangement of an ozone producing apparatus according to Embodiment 7 of the present invention.

FIG. 7 is a diagram showing an arrangement of an ozone producing apparatus according to Embodiment 7 of the present invention. In FIG. 7, an ozone densitometer 10 is disposed at a preliminarily determined location in the downstream side of a water flow ejector 7. The remaining arrangements are identical with those of the apparatus of FIG. 5.

Operations will now be explained. While the density of desorbed ozone in a gaseous state has been measured in the previous embodiment, this embodiment is arranged in such a manner that a density of desorbed ozone in a liquid state is measured. That is, the ozone density is measured at a preliminarily determined location in the downstream side of the water flow ejector 7 at the time of performing a desorbing process, and this value is sent to the control circuit 12 via a signal line S1. The remaining operations are identical with those of the case of Embodiment 5 previously described.

That is, the ozone density at the time of desorption is measured, and based on the peak value of ozone density at the time of desorption or time for exceeding a specific density obtained therefrom, based on a measured value after a specified time has lapsed from the start of the desorption, or based on the whole fluctuation pattern of the measured value, a control target value for the cooling temperature in the cooling source 5 is calculated at the control circuit 12 to set these to specified values, and the calculated value is used to control the temperature in the cooling source 5 to adjust the cooling temperature of the adsorbent in the adsorption/desorption tower 4.

Since the present embodiment is arranged in such a manner that the density of desorbed ozone is measured at a preliminarily determined location in the downstream side of the water flow ejector 7 and the cooling temperature of the cooling source 5 is adjusted based on this measured value to be the specified value, a specified amount of ozone can be desorbed and treated in a stable manner also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

Embodiment 8

Figure 8:
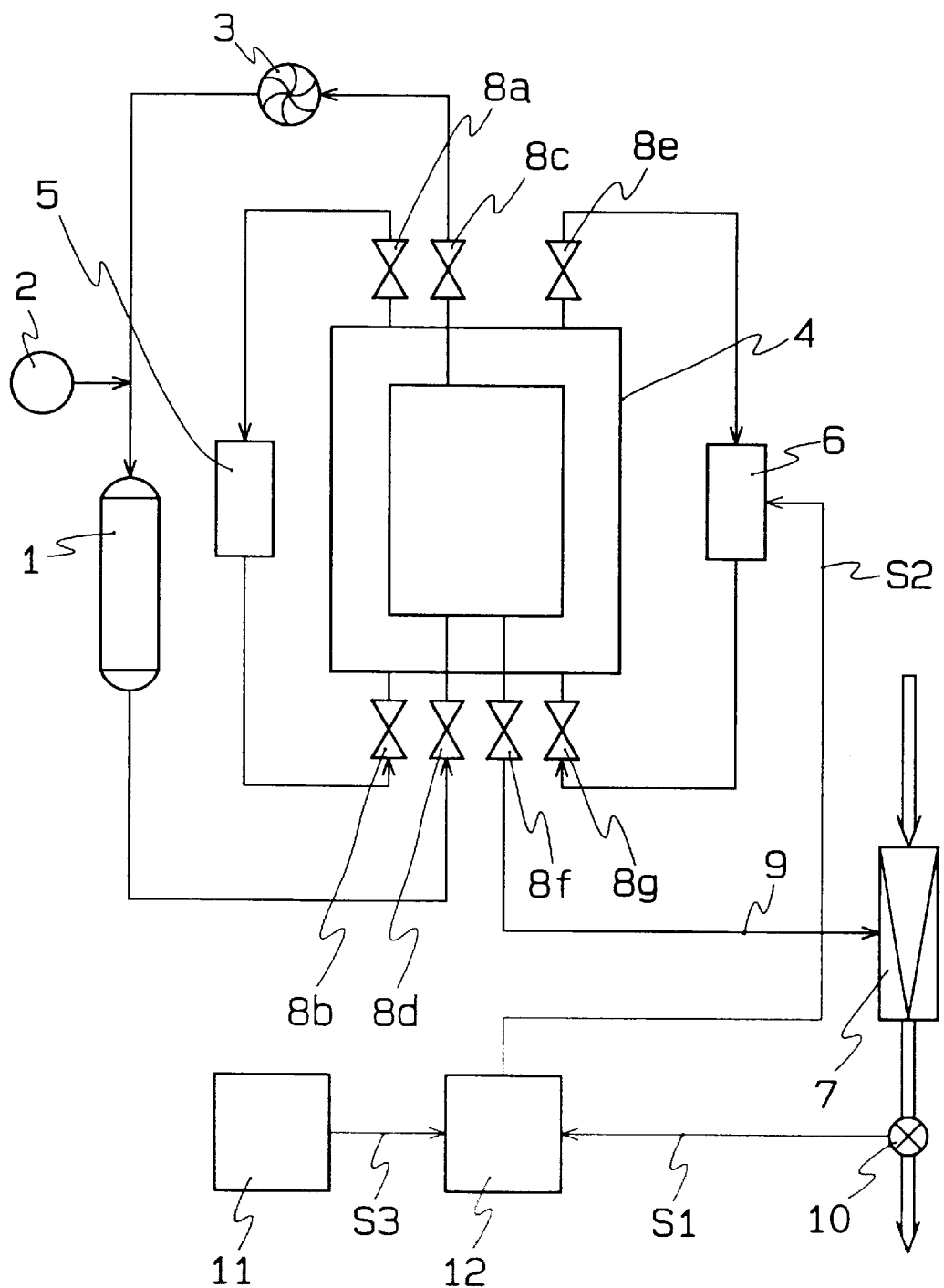
FIG. 8 is a diagram showing an arrangement of an ozone producing apparatus according to Embodiment 8 of the present invention.

FIG. 8 is a diagram showing an arrangement of an ozone producing apparatus according to Embodiment 8 of the present invention. In FIG. 8, a signal line S2 connects a control circuit 12 and a heating source 6. The remaining arrangements are identical with those of the apparatus of FIG. 7.

Operations will now be explained. These operations are almost identical with those of Embodiment 7. That is, by using an ozone densitometer 10 disposed at a preliminarily determined location in the downstream side of the water flow ejector 7, the density of desorbed ozone is measured. This obtained value is supplied to the control circuit 12 via a signal line S1, and the control circuit 12 calculates a control target value for the heating temperature of the heating source 6 based on the measured value for the desorbed ozone density and the set value for the desorbed ozone density which is set at a setting device 11 and supplied via a signal line S3, similarly to Embodiment 5.

This calculated value is sent to the heating source 6 via a signal line S2, and the heating source 6 so adjusts the heating temperature for medium, that is, the temperature of the adsorbent in the adsorption/desorption tower 4 at the time of desorption as to be this value. By changing the heating temperature of the adsorbent, the ozone adsorbing characteristics of the adsorbent change, so that the amount of ozone adsorbed and stored at the adsorbent in the adsorption/desorption tower 4 can be adjusted.

Since this embodiment is arranged in such a manner that the density of desorbed ozone is measured at a preliminarily determined location in the downstream side of the water flow ejector 7, and the temperature of medium in the heating source 6, that is, the heating temperature of the adsorbent in the adsorption/desorption tower 4, is adjusted such that the measured value is made to be a specified value, a specified amount of ozone can be desorbed and treated in a stable manner also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

Embodiment 9

Figure 9:
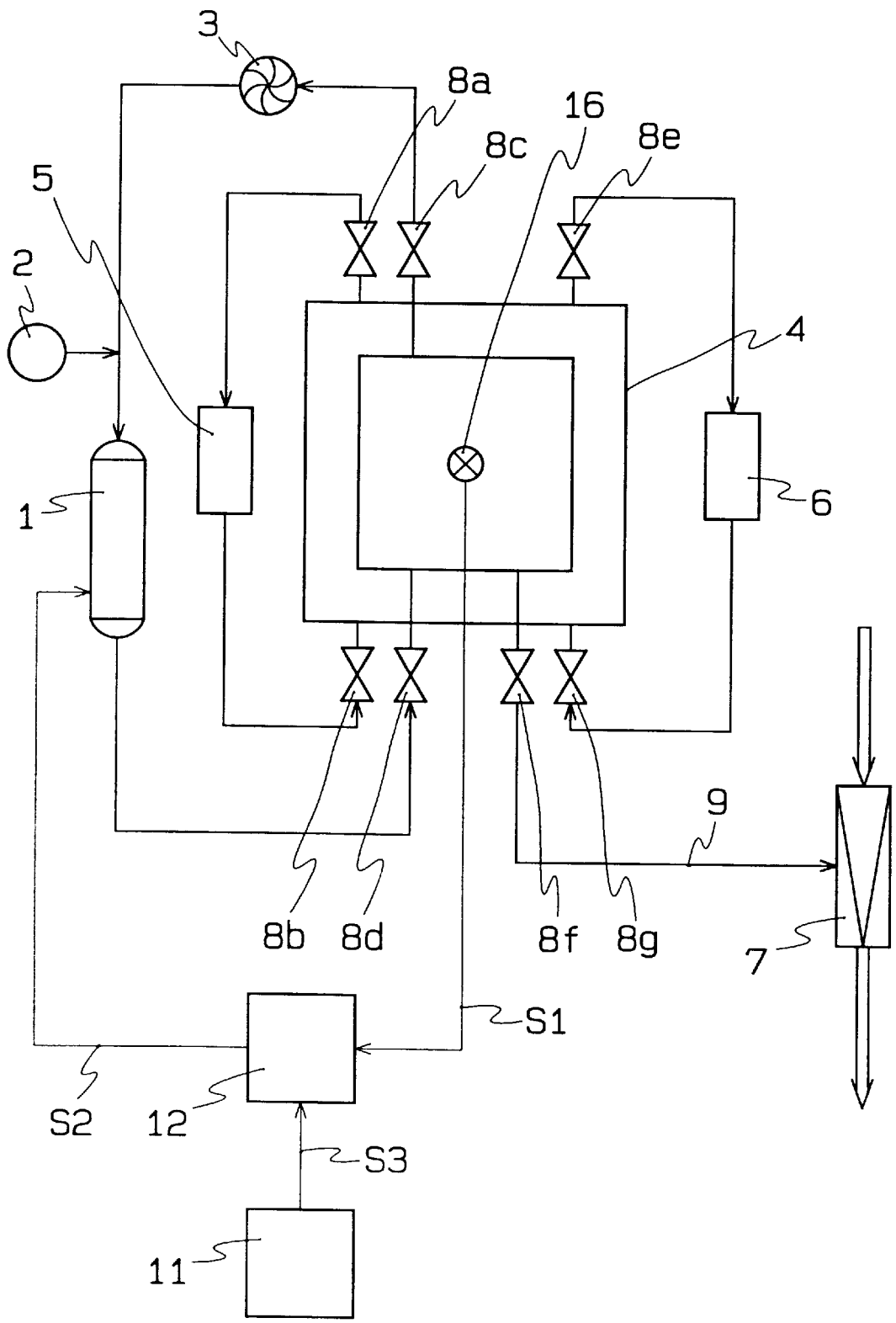
FIG. 9 is a diagram showing an arrangement of an ozone producing apparatus according to Embodiment 9 of the present invention.

FIG. 9 is a diagram showing an arrangement of an ozone producing apparatus according to Embodiment 9 of the present invention. In FIG. 9, the apparatus includes a pressure detecting means, and numeral 16 denotes a pressure gauge employed as the pressure measuring means which is provided to an adsorption/desorption tower 4 for measuring a pressure of desorbed gas at the time of desorption. Corresponding control signals are sent as outputs to a control circuit 12 through a signal line S1. The remaining arrangements are identical with those of the apparatuses of FIG. 1 and FIG. 2.

Operations will now be explained. These operations are almost identical with those of Embodiments 1 and 2. That is, by using the pressure gauge 16 provided to the adsorption/desorption tower 4, pressure in the adsorption/desorption tower 4 at the time of desorption, that is, pressure of gas including desorbed ozone, is measured. This measured value is supplied to the control circuit 12 via the signal line S1. The control circuit 12 calculates an amount of electric power for the ozone generator 1 by using, for instance, the following equation based on the measured value for the desorbed ozone pressure and the set value for the desorbed ozone pressure which is set at the setting device 11 and supplied via a signal line S3.

$$E = K(PO_3 o - PO_3 s)$$

Note that E denotes a calculated value (control target value) for the amount of electric power for the ozone generator 1, $PO_3o$ a measured value for the pressure of desorbed ozone gas, $PO_3s$ a control set value for the pressure of desorbed ozone gas, and K a control gain.

The calculated value E for the amount of electric power for the ozone generator 1 is sent to the ozone generator 1 via a signal line S2 and the amount of electric power is adjusted in the ozone generator 1 to coincide with the calculated value.

While the ozone generator for producing ozone is terminated in the desorbing process since an adsorbing process in which ozone is adsorbed and stored in the adsorption/desorption tower 4 and a desorbing process for desorbing the same is alternately performed in this kind of apparatus, this embodiment is arranged in such a manner that the pressure of desorbed ozone is measured in the desorbing process and the amount of electric power of ozone for the ozone generator 1 is calculated for the following adsorbing process to operate the ozone generator 1 in the following adsorbing process by using this calculated value.

Since the amount or density of desorbed ozone and gas pressure at the time of desorption are correlated to each other, and a pressure gauge is inexpensive compared to an ozone densitometer which is an expensive measuring device, an apparatus of low cost can be manufactured while obtaining equivalent control effects like in the case of employing an ozone densitometer.

When employing this apparatus for preventing slime adhesion to a piping, important factors for treatment are a peak density of desorbed ozone and a treatment time, and therefore improved effects can be obtained by measuring a peak value for the ozone density at the time of desorption, that is, by measuring a pressure of desorbed gas which is correlated to this density, and maintaining this value to a specified value; by measuring a time in which the pressure of desorbed ozone is not less than a reference value; or by maintaining the gas pressure of desorbed ozone after a specified time has passed or during this specified time from the start of desorption since ozone of high density can be obtained at the start of desorption. It is of course possible to continuously measure fluctuations in the density of desorbed ozone and to make the whole fluctuation pattern to be a specified pattern.

While this embodiment has been explained by taking a case in which the ozone generator is continuously driven without changing the time for the desorbing process but adjusting the amount of electric power per hour, it is also possible to adjust the amount of electric power without changing the amount of electric power per hour but by changing the time for the desorbing process.

In this embodiment, attention has been paid to the pressure of desorbed gas which is correlated to the density of desorbed ozone, and the pressure of desorbed gas is measured by using a pressure gauge which is more inexpensive than an ozone densitometer, and an amount of electric power for the ozone generator 1 is adjusted based on this measured value such that this is made to be the specified value. With this arrangement, a specified amount of ozone can be desorbed and treated in a stable manner by using a measuring device of low cost also in a case in which characteristics of the adsorbent or the ozone generator should happen to be changed, so that adhesion of slime can be prevented in a stable manner over a long period.

Embodiment 10

Figure 10:
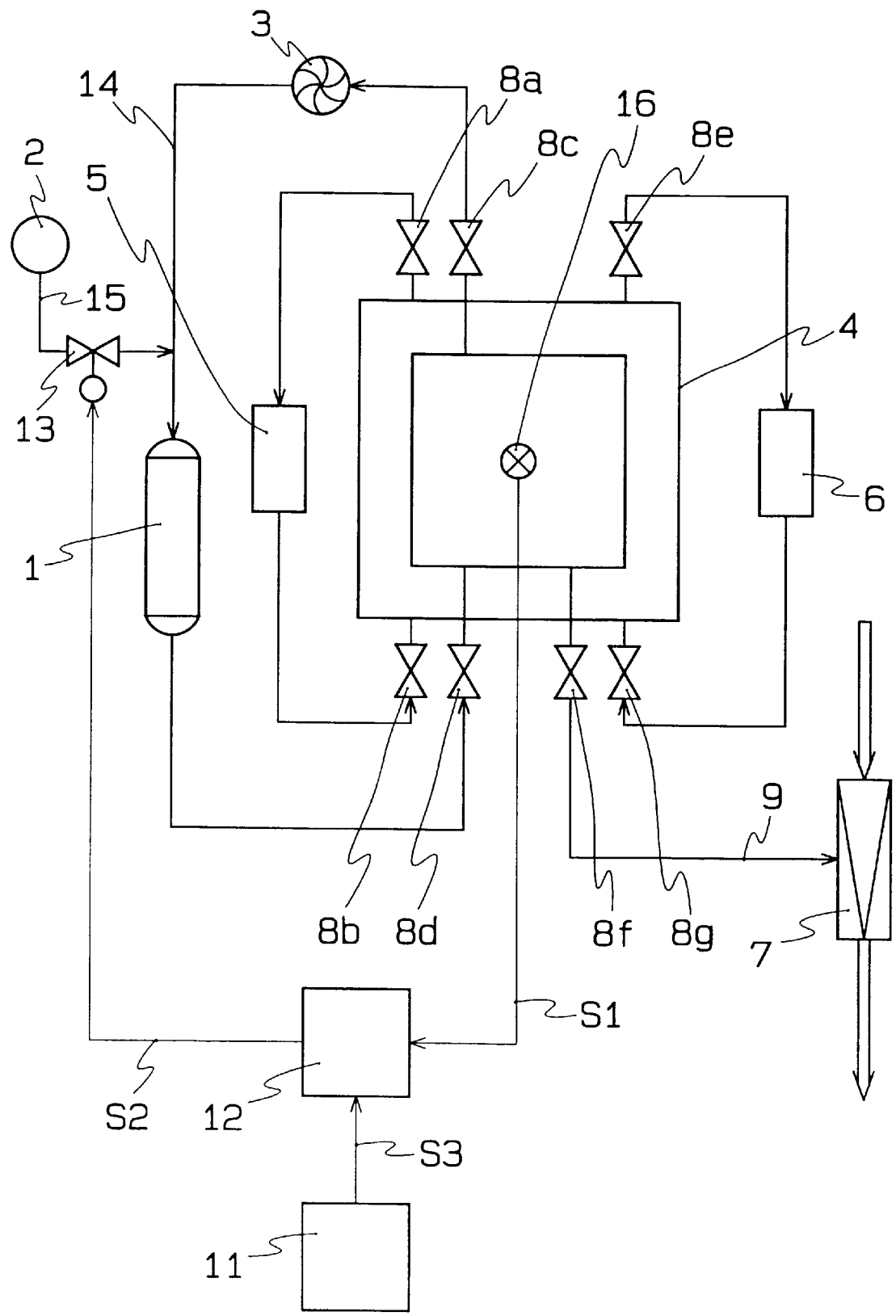
FIG. 10 is a diagram showing an arrangement of an ozone producing apparatus according to Embodiment 10 of the present invention.

FIG. 10 is a diagram showing an arrangement of an ozone producing apparatus according to Embodiment 10 of the present invention. In FIG. 10, an output signal of a control circuit 12 is sent to, via a signal line S2, a pressure adjusting valve 13 provided to a piping 15 which connects an oxygen supply source 2 and a piping 14. The remaining arrangements are identical with those of the apparatus of FIG. 9.

Operations will now be explained. These operations are almost identical with those of Embodiment 9. That is, by using a pressure gauge 16 provided in an adsorption/desorption tower 4, pressure in the adsorption/desorption tower 4 at the time of desorption, that is, pressure of gas including desorbed ozone, is measured.

This measured value is supplied to the control circuit 12 via a signal line S1, and the control circuit 12 calculates a control target value for the pressure of the ozone generator 1 by using, for instance, the following equation based on the measured value for the desorbed ozone pressure and the set value for the desorbed ozone pressure which is set at the setting device 11 and supplied via a signal line S3.

$B=K(PO_3o-PO_3s)$

Note that B denotes a control target value for pressure in the ozone generator 1.

The calculated value is sent to the pressure adjusting valve 13 through the signal line S2, and the pressure adjusting valve 13 adjusts oxygen supply such that the pressure in the ozone generator 1, that is, the pressure in the piping 14 is made to be this value. By changing the pressure in the ozone generator 1, the ozone generating characteristics are changed so that the amount of ozone adsorbed and stored at the adsorbent in the adsorption/desorption tower 4, that is, the amount of desorbed ozone, can be adjusted.

Since the pressure in the adsorption/desorption tower 4, that is, the pressure of the gas containing desorbed ozone, which is correlated to the density or the amount of desorbed ozone, is measured, and the pressure of the ozone generator 1 is adjusted such that the measured value is made to be a specified value, a specified amount of ozone can be desorbed and treated in a stable manner also in a case in which characteristics of the adsorbent or the ozone generator should happen to be changed, so that adhesion of slime can be prevented in a stable manner over a long period. Further, since a pressure gauge is inexpensive compared to an ozone densitometer, equivalent effects like in the case of employing an ozone densitometer can be realized with a device of low cost.

Embodiment 11

Figure 11:
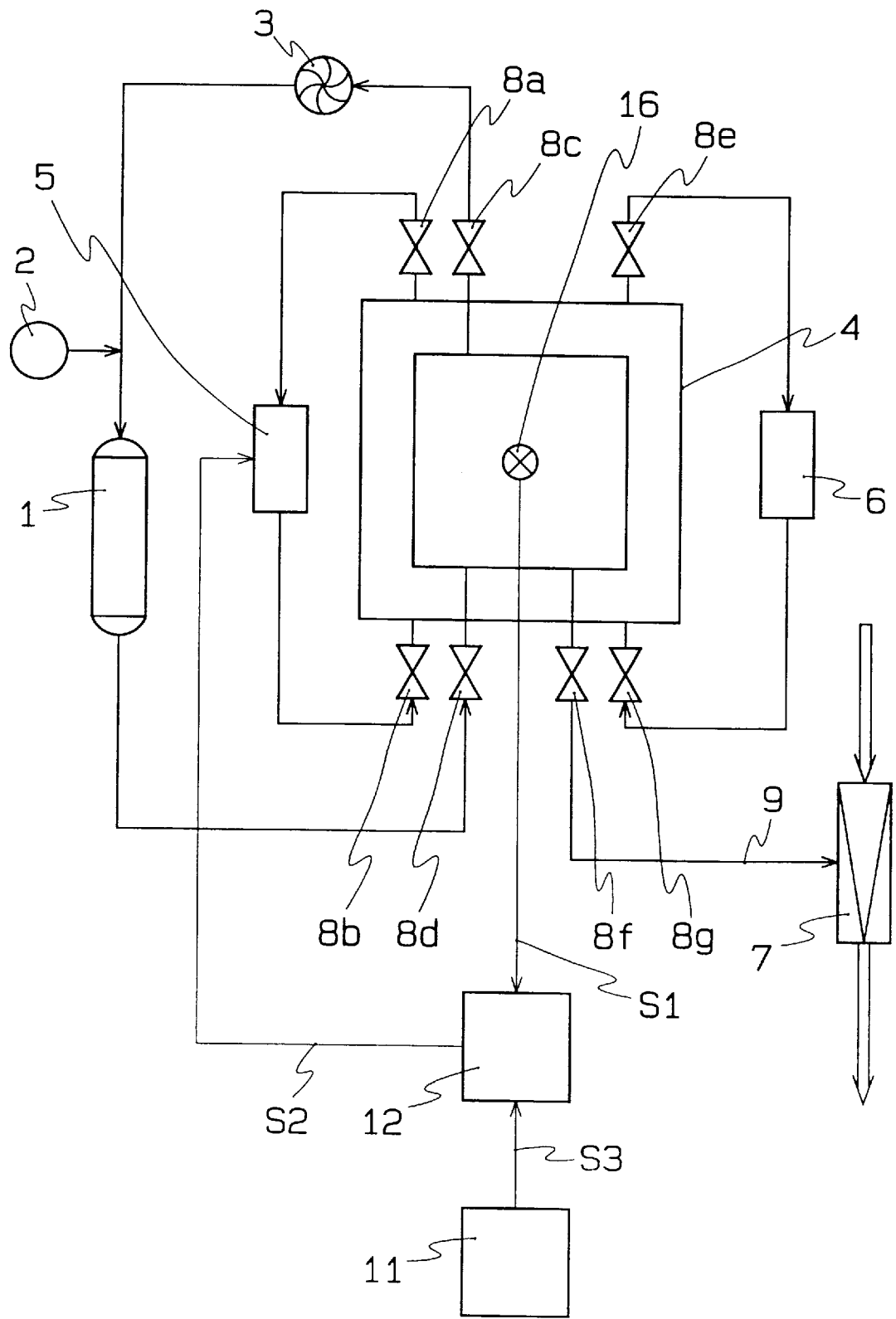
FIG. 11 is a diagram showing an arrangement of an ozone producing apparatus according to Embodiment 11 of the present invention.

FIG. 11 is a diagram showing an arrangement of an ozone producing apparatus according to Embodiment 11 of the present invention. In FIG. 11, a signal line S2 connects a control circuit 12 and a cooling source 5. The remaining arrangements are identical with those of the apparatus of FIG. 10.

Operations will now be explained. These operations are almost identical with those of Embodiment 10. That is, by using a pressure gauge 16 provided in an adsorption/desorption tower 4, pressure in the adsorption/desorption tower 4 at the time of desorption, that is, pressure of gas including desorbed ozone, is measured.

This measured value is supplied to the control circuit 12 via a signal line S1, and the control circuit 12 calculates a control target value for the cooling temperature of the cooling source 5 by using, for instance, the following equation based on the measured value for the desorbed ozone pressure and the set value for the desorbed ozone pressure which is set at the setting device 11 and supplied via a signal line S3.

$$T_c = K(PO_3o - PO_3s)$$

Note that $T_c$ denotes a control target value for the cooling temperature of the cooling source 5.

This calculated value is sent to the cooling source 5 via the signal line S2, and the cooling source 5 so adjusts the temperature of the cooling medium, that is, the cooling temperature of the adsorbent in the adsorption/desorption tower 4 as to be this value. By changing the cooling temperature of the adsorbent, the ozone adsorbing characteristics of silica gel change so that the amount of ozone adsorbed and stored at the adsorbent in the adsorption/desorption tower 4 can be adjusted.

Since the pressure in the adsorption/desorption tower 4, that is, the pressure of gas containing desorbed ozone, which is correlated to the density or the amount of desorbed ozone, is measured, and temperature of a cooling medium of the cooling source 5, that is, a cooling temperature of the adsorbent in the adsorption/desorption tower 4 is adjusted such that the measured value is made to be a specified value, a specified amount of ozone can be desorbed and treated in a stable manner also in a case in which characteristics of the adsorbent or the ozone generator should happen to be changed, so that adhesion of slime can be prevented in a stable manner over a long period. Further, since a pressure gauge is inexpensive compared to an ozone densitometer, equivalent effects like in the case of employing an ozone densitometer can be realized with a device of low cost.

Embodiment 12

Figure 12:
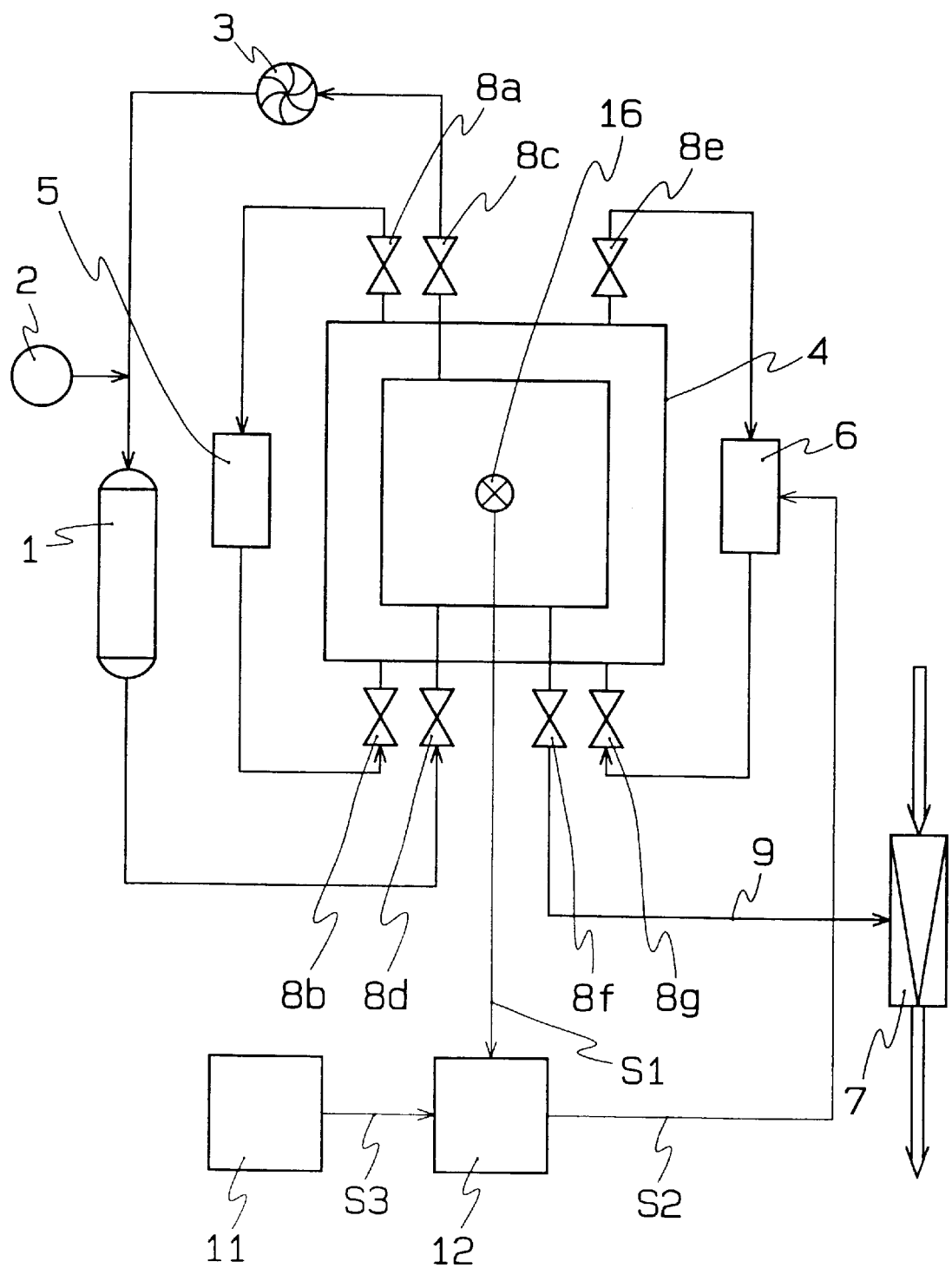
FIG. 12 is a diagram showing an arrangement of an ozone producing apparatus according to Embodiment 12 of the present invention.
Figure 13:
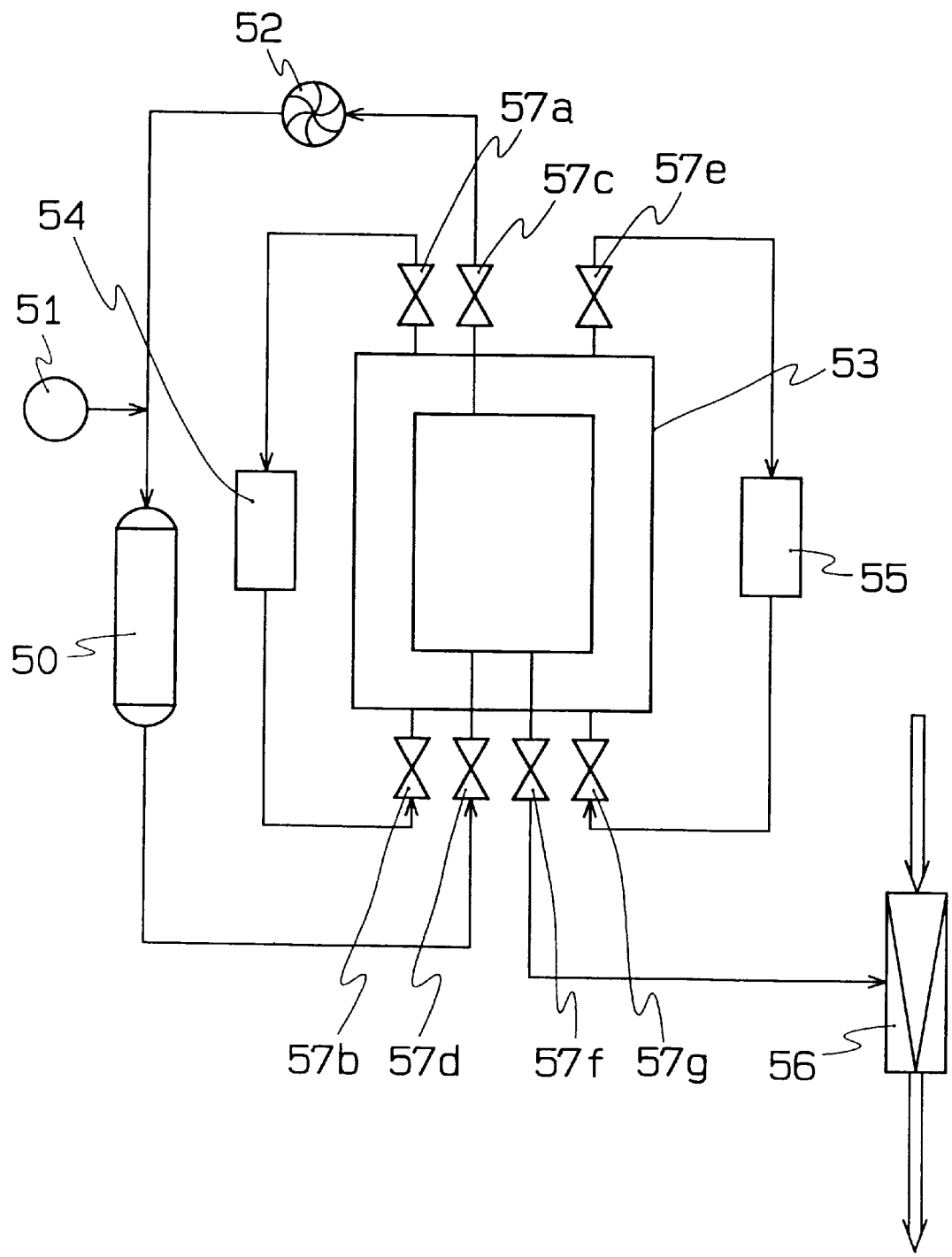
FIG. 13 is a diagram showing an arrangement of a conventional ozone producing apparatus.

FIG. 12 is a diagram showing an arrangement of an ozone producing apparatus according to Embodiment 12 of the present invention. In FIG. 12, a signal line S2 connects a control circuit 12 and a heating source 6. The remaining arrangements are identical with those of the apparatus of FIG. 11.

Operations will now be explained. These operations are almost identical with those of Embodiment 11. That is, by using a pressure gauge 16 provided in an adsorption/desorption tower 4, pressure in the adsorption/desorption tower 4 at the time of desorption, that is, pressure of gas including desorbed ozone, is measured.

This measured value is supplied to the control circuit 12 via a signal line S1, and the control circuit 12 calculates a control target value for the heating temperature of the heating source 6 based on the measured value for the desorbed ozone density and the set value for the desorbed ozone density which is set at the setting device 11 and supplied via a signal line S3, similarly to the previous Embodiment 11.

This calculated value is sent to the heating source 6 via the signal line S2, and the heating source 6 so adjusts the heating temperature for the medium, that is, the temperature of the adsorbent in the adsorption/desorption tower 4 at the time of desorption as to be this value. By changing the heating temperature of the adsorbent, the ozone adsorbing characteristics of silica gel change, so that the amount of ozone adsorbed and stored at the adsorbent in the adsorption/desorption tower 4 can be adjusted.

Since this embodiment is arranged in such a manner that pressure in the adsorption/desorption tower 4 which is correlated to the density and amount of desorbed ozone, that is, pressure of gas including desorbed ozone, is measured, and temperature of the heating medium in the heating source 6, that is, heating temperature of the adsorbent in the adsorption/desorption tower 4, is adjusted such that the measured value is made to be the specified value, a specified amount of ozone can be desorbed and treated in a stable manner also in a case in which characteristics of the adsorbent or the ozone generator should happen to be changed, so that adhesion of slime can be prevented in a stable manner over a long period. Further, since a pressure gauge is inexpensive compared to an ozone densitometer, equivalent effects like in the case of employing an ozone densitometer can be realized with a device of low cost.

According to the ozone producing apparatus of the first invention, the density of desorbed ozone is measured and the amount of electric power for the ozone generator is adjusted such that the measured value is made to be the preliminarily determined value. With this arrangement, ozone can be stored in an amount as required for obtaining suitable slime removing effects in accordance with fluctuation in quality or temperature of water, so that a specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

According to the ozone producing apparatus of the second invention, pressure of desorbed ozone is measured and gas pressure in the ozone generator is adjusted such that the measured value is made to be a preliminarily determined value. With this arrangement, ozone can be stored in an amount as required for obtaining suitable slime removing effects in accordance with fluctuation in quality or temperature of water so that a specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

According to the ozone producing apparatus of the third invention, density of desorbed ozone is measured and temperature in the adsorption/desorption tower is adjusted such that the measured value is made to be a preliminarily determined value. With this arrangement, ozone can be stored in an amount as required for obtaining suitable slime removing effects in accordance with fluctuation in quality or temperature of water so that a specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

According to the ozone producing apparatus of the fourth invention, pressure of desorbed ozone is measured and an amount of electric power for the ozone generator is adjusted such that the measured value is made to be a preliminarily determined value. With this arrangement, ozone can be stored in an amount as required for obtaining suitable slime removing effects in accordance with fluctuation in quality or temperature of water so that a specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period.

According to the ozone producing apparatus of the fifth invention, pressure of desorbed ozone is measured and gas pressure in the ozone generator is adjusted such that the measured value is made to be a preliminarily determined value. With this arrangement, ozone can be stored in an amount as required for obtaining suitable slime removing effects in accordance with fluctuation in quality or temperature of water so that a specified amount of ozone can be desorbed and treated in a stable manner in a just sufficient amount also in a case in which characteristics of the adsorbent or the ozone generator, temperature or degree of pollution of the water, multiplication speed of microorganisms or reaction speed of ozone should happen to be changed, so that adhesion of slime can be prevented in a stable manner over a long period. Further, when measuring a pressure of desorbed gas, a pressure gauge is inexpensive compared to an ozone densitometer, and equivalent effects like in the case of employing an ozone densitometer can be realized with a device of low cost.

What is claimed is:

1. An ozone producing apparatus comprising an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring device configured to measure a density of desorbed ozone, and a control circuit device configured to adjust an amount of electric power for the ozone generator by comparing the measured value detected by the measuring device with a set value.

2. An ozone producing apparatus comprising an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring device configured to measure a density of desorbed ozone, and a control circuit device configured to adjust a gas pressure for the ozone generator by comparing the measured value detected by the measuring device with a set value.

3. An ozone producing apparatus comprising an ozone generator for generating ozonized oxygen, an adsorption/desorption tower for adsorbing and storing ozone from ozonized oxygen generated by the ozone generator, and an ozone desorbing means for desorbing adsorbed and stored ozone for supply, wherein the apparatus further includes an ozone density measuring device configured to measure a density of desorbed ozone, and a control circuit for device configured to adjust a temperature in the adsorption/desorption tower by comparing the measured value detected by the measuring device with a set value.

* * * * *